United States Patent
Goodwill et al.

(10) Patent No.: US 11,598,848 B2
(45) Date of Patent: Mar. 7, 2023

(54) OPTICAL PULSE CLIPPER FOR LIDAR

(71) Applicants: Dominic John Goodwill, Ottawa (CA); Patrick Dumais, Ottawa (CA)

(72) Inventors: Dominic John Goodwill, Ottawa (CA); Patrick Dumais, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 769 days.

(21) Appl. No.: 16/563,336

(22) Filed: Sep. 6, 2019

(65) Prior Publication Data

US 2019/0391240 A1 Dec. 26, 2019

Related U.S. Application Data

(63) Continuation of application No. PCT/CA2017/050488, filed on Apr. 20, 2017.

(51) Int. Cl.
| | | |
|---|---|---|
| *G02F 1/295* | (2006.01) | |
| *G02F 1/025* | (2006.01) | |
| *G01S 7/484* | (2006.01) | |
| *G01S 7/10* | (2006.01) | |
| *G01S 7/481* | (2006.01) | |
| *H01S 3/00* | (2006.01) | |
| *G01S 17/10* | (2020.01) | |
| *G02F 1/015* | (2006.01) | |

(52) U.S. Cl.
CPC ............ *G01S 7/4814* (2013.01); *G01S 7/484* (2013.01); *G01S 17/10* (2013.01); *G02F 1/025* (2013.01); *G02F 1/2955* (2013.01); *H01S 3/0057* (2013.01); *G02F 1/0156* (2021.01); *H01S 2301/08* (2013.01)

(58) Field of Classification Search
None
See application file for complete search history.

(56) References Cited

U.S. PATENT DOCUMENTS

| | | |
|---|---|---|
| 6,252,892 B1 | 6/2001 | Jiang et al. |
| 7,840,098 B2 | 11/2010 | Rong |
| 8,035,888 B2 | 10/2011 | Baillon et al. |
| (Continued) | | |

FOREIGN PATENT DOCUMENTS

| | | |
|---|---|---|
| CN | 201364386 Y | 12/2009 |
| CN | 101788667 A | 7/2010 |
| (Continued) | | |

OTHER PUBLICATIONS

Salvatore Gnecchi, Steve Buckley, Stephen Bellis, Colin Barry, Carl Jackson "SiPM Sensors for ToF Ranging Applications", published by SensL Technologies Ltd (2016).

(Continued)

*Primary Examiner* — Michelle R Connelly

(57) ABSTRACT

Aspects of the disclosure provide a system and method used for time-of-flight lidar applications. Such systems and methods include a laser and pulse clipper which produces a shuttering effect to reduce the instantaneous output power from the pulse clipper. Accordingly the output from the pulse clipper is more suitable for time-of-flight lidar applications than that initially produced by the laser. This can allow for lasers which may otherwise exceed eye safety limits to be used for time-of-flight lidar applications without exceeding the eye safety limits.

26 Claims, 10 Drawing Sheets

(56) References Cited

U.S. PATENT DOCUMENTS

| | | | |
|---|---|---|---|
| 2007/0159683 A1 | 7/2007 | Baillon et al. | |
| 2010/0187442 A1* | 7/2010 | Hochberg | ............... G01S 17/42 |
| | | | 250/492.1 |
| 2011/0149363 A1 | 6/2011 | Harris et al. | |
| 2012/0281199 A1 | 11/2012 | Thielen et al. | |

FOREIGN PATENT DOCUMENTS

| | | |
|---|---|---|
| CN | 106449684 A | 2/2017 |
| EP | 1014112 A2 | 6/2000 |
| EP | 1738444 A1 | 1/2007 |
| WO | 2012062622 A1 | 5/2012 |
| WO | WO-2012062622 A1 * 5/2012 ........... H01S 3/0057 |

OTHER PUBLICATIONS

Robert W. Schirmer and Alexander L. Gaeta "Nonlinear mirror based on two-photon absorption"; Optical Society of America B, vol. 14, Issue 11, pp. 2865 to 2868 (1997).

Robert W. Schirmer and Alexander L. Gaeta "Nonlinear mirror based on two-photon absorption"; Proceedings of Conference on Lasers and Electro-Optics 1997, published by OSA The Optical Society, pp. 89-90 (1997).

Koji Yamada "Silicon Photonic Wire Waveguides: Fundamentals and Applications"; Silicon Photonics II., Topics in Applied Physics 119, 1-29 (2011); Springer-Verlag Berlin Heidelberg 2011.

\* cited by examiner

OPTICAL PULSE CLIPPER FOR LIDAR

TECHNICAL FIELD

This disclosure relates to the field of optical sensing, and in particular to Lidar.

BACKGROUND

Lidar systems generate a pulse, typically from a laser, and utilize reflected light for imaging, detection and ranging. Lidar systems have many applications, including use in sensors for automated automotive applications. Lidar is sometimes also spelled LIDAR as an acronym for either Light Detection and Ranging or Laser Radar.

To avoid eye injuries, eye safety regulations exist in some jurisdictions for lidar systems. Eye safety regulations limit the power level for continuous wave lasers or put limits on the allowed energy per pulse for pulse lasers.

In order to obtain high resolution (in the order of centimeters) distance measurements, a short laser pulse in the order of 100 picoseconds (hereafter ps) is needed. However, it is difficult/expensive to make a laser generate a pulse sufficiently short to satisfy the distance requirements for some lidar applications, while remaining within eye safety regulations.

Accordingly, there is a need for a system and method that at least partially addresses one or more limitations of the prior art. In particular, there is a need for a lidar system which is inexpensive, has sufficient range for a variety of lidar applications, and satisfies eye safety limits.

This background information is provided to reveal information believed by the applicant to be of possible relevance to the present invention. No admission is necessarily intended, nor should be construed, that any of the preceding information constitutes prior art against the present invention.

SUMMARY

Time-of-flight lidar systems can be used to detect and range external objects. The "time of flight" between the transmission of a pulse and detection of the corresponding scattered light is indicative of distance to the point from which the light was scattered, while the direction of the transmitter beam and/or the scattered light can be used to determine the direction to the point from which the light was scattered.

Aspects of the disclosure provide a system and method used for time-of-flight lidar applications. Such systems and methods include a laser and pulse clipper which produces a shuttering effect to reduce the instantaneous output power from the pulse clipper. Accordingly the output from the pulse clipper is more suitable for time-of-flight lidar applications than that initially produced by the laser. This can allow for lasers which may otherwise exceed eye safety limits to be used for time-of-flight lidar applications without exceeding the eye safety limits.

An aspect of the disclosure is directed to a time-of-flight apparatus. The time-of-flight apparatus includes a laser configured to produce a laser pulse of light having a first peak power and first duration. The time-of-flight apparatus also includes a pulse clipper for receiving the laser pulse from the laser, wherein the pulse clipper is configured to produce a clipped pulse from the laser pulse, wherein the clipped pulse has a second duration less than the first duration. In some embodiments the time-of-flight apparatus also includes a targeting device for directing the clipped pulse towards an external object. In some embodiments the targeting device includes a beam steerer to steer the clipped pulse towards the external object. In some embodiments, the clipped pulse has a second peak power during the second duration and wherein an instantaneous power of the clipped pulse at a moment of time after the second duration divided by the second peak power is smaller than an instantaneous power of the laser pulse at the moment of time after the second duration divided by the first peak power. In some embodiments the time-of-flight apparatus also includes a receiver configured to receive a portion of the clipped pulse reflected from the external object. In some embodiments the pulse clipper includes an optical waveguide having an induced absorption region, the induced absorption region including a semiconductor having a bandgap energy. In some embodiments the semiconductor comprises a junction having p-doped and n-doped regions. In some embodiments the time-of-flight apparatus also includes a pair of electrodes for applying an electric field across the junction. In some embodiments the induced absorption region is configured to increase a density of free carriers in the semiconductor upon receiving the laser pulse. In some embodiments the apparatus further includes an electric pulse control for applying the electric field between laser pulses to reduce the density of free carriers prior to a next laser pulse. In some embodiments the induced absorption region is configured to increase a density of free carriers in the semiconductor upon receiving the laser pulse. In some embodiments an additional density of free carriers is created by absorption of light by free carriers. In some embodiments the laser and the pulse clipper are configured such that the free carriers induced in the semiconductor produce a shuttering effect which substantially blocks transmission of the pulse through the optical waveguide after the second duration. In some embodiments the laser produces a pulse having photon energy between half the bandgap energy and the bandgap energy. In some such embodiments the shuttering effect is triggered by two-photon absorption which increases the density of free carriers. In some embodiments the laser produces a pulse having photon energy above the bandgap energy. In some such embodiments the shuttering effect is triggered by single photon absorption which increases the density of free carriers. In some embodiments the beam steerer is a phased array beam steerer. In some embodiments the phased array beam steerer and the pulse clipper are implemented in a photonic integrated circuit. In some embodiments the optical waveguide includes a waveguide core including the induced absorption region configured as an inverse taper having a narrow end proximate to the laser. In some embodiments the laser has an optical mode output width of a few micrometers and the pulse clipper is configured such that the width of the optical mode is wider at the narrow end than at a wider end of the inverse taper. In some embodiments the optical waveguide includes a waveguide core including the induced absorption region configured as a wide waveguide taper having a wide end receiving the pulse from the laser and a narrow end coupled to the beam steerer. In some embodiments the first duration is between 2 ns and 20 ns, and the second duration is approximately 100 ps. In some embodiments the first peak power is between 5 Watts and 100 Watts. In some embodiments the first peak power is between 10 Watts and 30 Watts.

Another aspect of the disclosure is directed to a lidar system including a transmitter and a receiver. In such a lidar system, the transmitter includes a laser, a pulse clipper and a targeting device for directing the clipped pulse towards an external object. In such a system the laser is configured to produce a laser pulse having a first peak power and a first duration. In such a lidar system the pulse clipper receives the laser pulse from the laser. The pulse clipper is configured to produce a clipped pulse from the laser pulse, the clipped pulse has a second peak power during a second duration and wherein an instantaneous power of the clipped pulse at a moment of time after the second duration divided by the second peak power is smaller than an instantaneous power of the laser pulse at the moment of time after the second duration divided by the first peak power. The targeting device directs the clipped pulse towards an external object. The receiver is configured to receive a portion of the clipped pulse reflected from the external object. In some embodiments the targeting device is a beam steerer for steering the clipped pulse towards an external object. In some embodiments the pulse clipper includes an optical waveguide having an active region, the active region including a semiconductor having a bandgap energy. In some embodiments the laser and pulse clipper are configured such that free carriers induced in the semiconductor produce a shuttering effect which substantially blocks transmission of the pulse through the optical waveguide after the second duration. In some embodiments the beam steerer is a phased array beam steerer. In some embodiments the beam steerer and pulse clipper are fabricated on a common substrate of a photonic integrated circuit.

The foregoing and other objects, features, aspects and advantages of the present invention will become more apparent from the following detailed description, taken in conjunction with the accompanying drawings which description is by way of example only.

BRIEF DESCRIPTION OF DRAWINGS

For a more complete understanding of this disclosure, reference is now made to the following brief description, taken in connection with the accompanying drawings and detailed description, wherein like reference numerals represent like parts.

DESCRIPTION OF EMBODIMENTS

Figure 1:
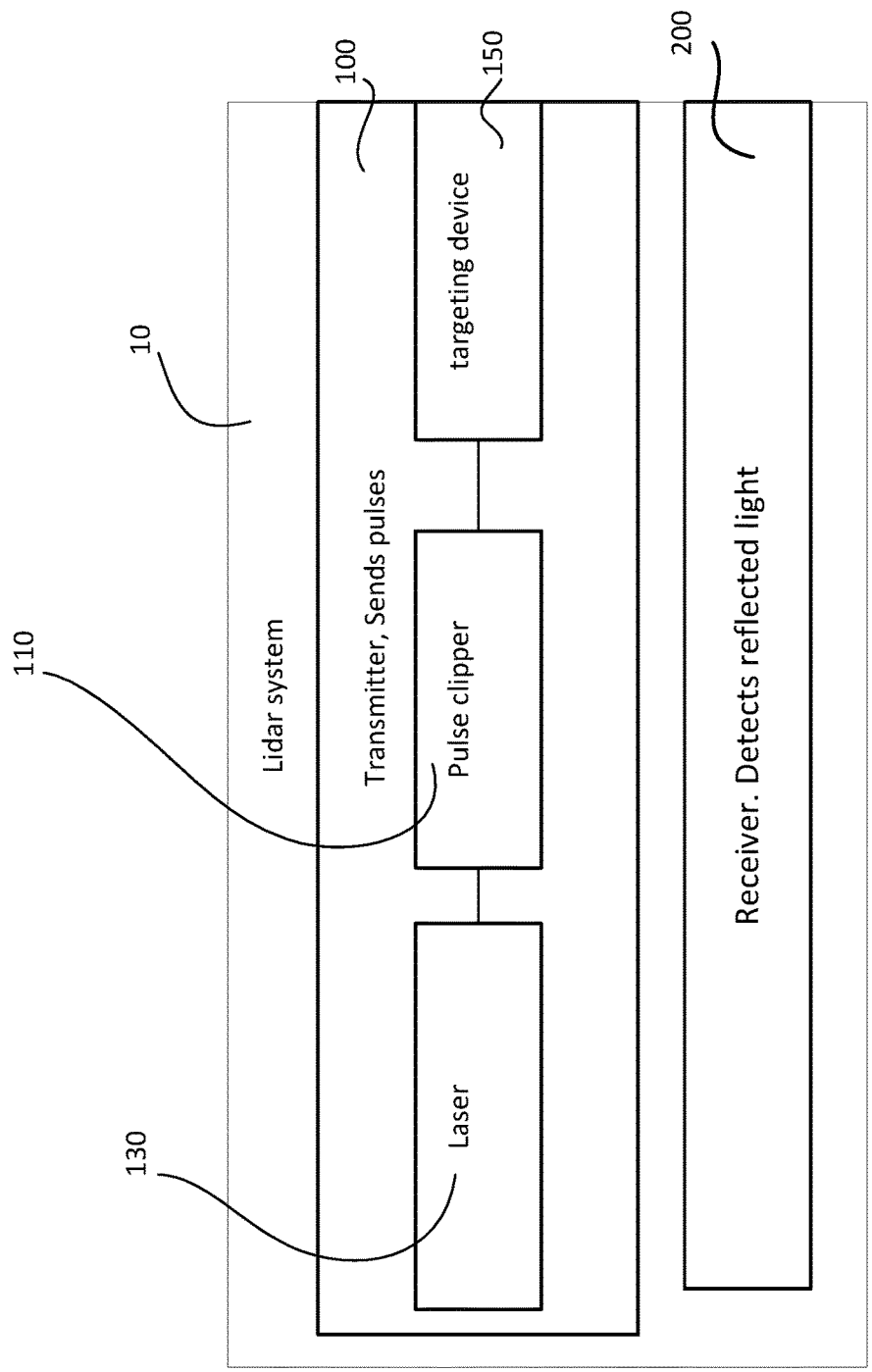
FIG. 1 is a block diagram of a lidar system according to an embodiment.

Embodiments will be discussed with reference to example "time-of-flight" lidar systems, for example for automated vehicle applications such as self-driving cars or drones. Other applications for time-of-flight lidar systems can include smart phones, gaming systems, virtual reality systems, imaging systems and physical security systems. Such systems utilize a lidar sensor which generates laser pulses, and senses the environment by measuring the reflected pulses. It is known for such systems that the resolution for imaging can depend on the duration of each laser pulse. For example, it is known that short laser pulses, in the order of 100 ps, are desired to obtain high resolution distance measurements from targets. More specifically, in order to discriminate a high resolution image, a lidar receiver can only utilize the first 100 ps of a reflected pulse. A pulse length can be longer, but the additional length is not as useful for high resolution imaging (in order to be able to discriminate distances on a per cm basis).

Semiconductor lasers with 2 ns to 20 ns pulse length with peak power levels in the 10's of Watts are relatively inexpensive, due to ease of manufacture. However, it is not as easy to manufacture laser devices which generate a short (100 ps) pulse length with a high peak power (approx. 10 Watt peak power) level. A laser pulse with a 2 ns to 20 ns pulse length and peak power level in the 10's of Watts can be utilized for some applications. For example, for telecommunication systems, where the laser light is safely contained within optical waveguides, eye safety concerns are not generally an issue (ignoring the requirements for proper care to be taken by technicians servicing such systems). Further, such lasers can be utilized in low resolution lidar systems such as lidar road speed enforcement systems, where the lidar is used for detecting a single large object as opposed to high resolution imaging. It is noted that eye safety regulations stipulate limits for the optical power averaged over time, or for the optical energy per group of pulses. Accordingly a lidar system contravenes lidar eye safety regulations when multiple pulses from such a laser are used within a short time frame, as would be needed for imaging.

Some prior art lidar systems utilize readily available inexpensive lasers which generate the longer pulses (in the order of 2 ns to 20 ns), but with lower power so as to not contravene eye safety. In order to obtain high resolution imaging, such systems utilize leading edge discriminators in the receiver so that the receiver only analyzes the leading edge of the received (reflected) signal. Such systems can obtain high temporal resolution and therefore good distance resolution. However such systems have disadvantages. First such systems have limited range due to the lower power lasers used in order to not contravene eye safety regulations. Also, such systems effectively waste a large fraction of the eye safe pulse-energy limit, by emitting a pulse for which only the leading edge is utilized by the receiver. Further such a system can introduce errors in some circumstances. For example, when detecting very low returns (e.g., a few photons per reflected pulse), the first received photon may not be within the leading edge of the reflected pulse. This can result in false measurements.

Accordingly, embodiments allow for lidar systems which can utilize the readily available long pulse length lasers (in the order of 2 ns to 20 ns) but obtain higher resolution and longer range than prior art lidar systems, without contravening established eye safety limits. It is noted that eye safety regulations apply primarily to light leaving the lidar system, but do not apply to light within the lidar system during normal operation. Embodiments allow for using such readily available and inexpensive longer pulse lasers, without wasting a large fraction of the eye safe pulse-energy limit, by utilizing a pulse clipper to limit the duration of the emitted pulse. Effectively such a pulse clipper acts as a shutter, blocking the light produced by the laser after a period of time.

FIG. 1 is a block diagram of a time-of-flight lidar system apparatus 10 according to an embodiment. The apparatus 10 includes a transmitter 100 which sends pulses of light towards an object to be ranged. As shown apparatus 10 may include a receiver 200 configured to receive (detect) and process the reflected pulse from the object. The transmitter 100 includes a laser 130 configured to produce a laser pulse, for example an infrared or visible light laser pulse, and a pulse clipper 110 which receives the output laser pulse from the laser and is configured to produce a clipped pulse as discussed in more detail below. A beam delivery device 150 may be provided for directing the clipped pulse towards an object that is being ranged. In some embodiments targeting device 150 includes a beam steerer to steer the clipped pulse towards the object that is being ranged. A beam steerer can be used to scan the object by steering the pulse to illuminate different portions of the object. In this case the receiver 200 can be configured to receive light from different portions of an object as the object is scanned. Embodiments will be discussed using examples of such a scanning lidar system, however it should be appreciated that the methods and systems discussed herein can be used for flash lidar systems. In a flash lidar embodiment, beam delivery device 150 includes a beam delivery component such as a lens or curved mirror, which spatially spreads the clipped pulse so as to illuminate the whole object using a single pulse.

The laser 130 produces a pulse of light with a first power for a first duration. The pulse clipper 110 receives the output pulse of light from the laser and is configured to produce a clipped pulse with a second duration, the second duration being less than the first duration. Examples of the pulse clipper will be discussed below. The pulse clipper 110 can be thought of as a shutter which allows the output laser pulse from the laser 130 to pass for the second duration, and then blocks the remainder of the pulse. This allows a relatively inexpensive laser, which produces the desired pulse peak power but for a duration which would exceed eye safety limits, to be used. In an ideal lossless world the clipped pulse would have the same peak power as the output peak power of the laser. It should be appreciated that in practice the pulse clipper 110 is not perfectly lossless, such that output from pulse clipper 110 will be less than the output from the laser 130 (the first power). However, if the loss is small, the pulse clipper 110 produces a clipped pulse which has a power level close to the first power during the second duration and has a significant drop in power from the first power after the second duration. This will be discussed below with reference to FIG. 3.

Figure 2:
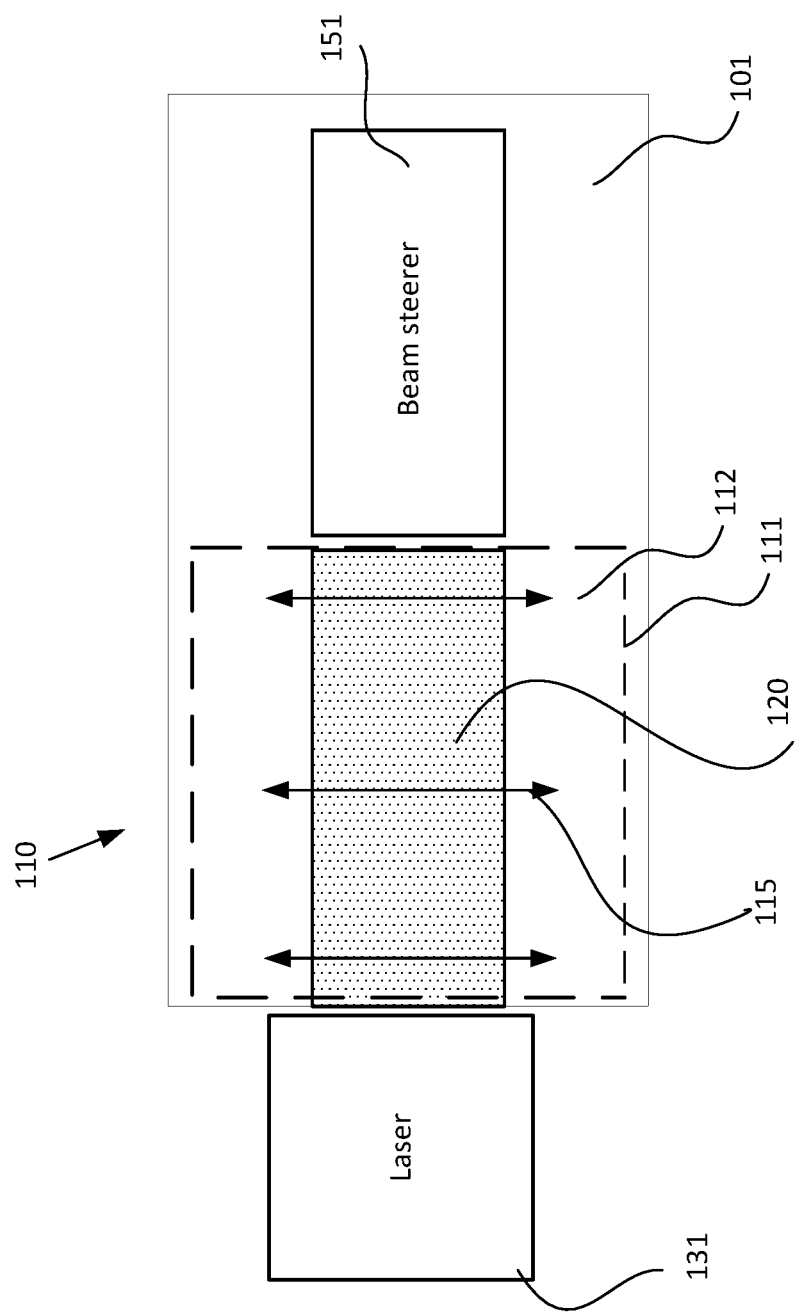
FIG. 2 is a top view of a transmitter according to an embodiment.

FIG. 2 is a top view of a transmitter, according to an embodiment. FIG. 2 illustrates a transmitter 101 which includes laser 131, the pulse clipper 110 and in this example the targeting device is a beam steerer 151. In this example, the pulse clipper 110 comprises an optical waveguide 111 having a waveguide core 120 including an induced absorption region, and a waveguide cladding 112. The induced absorption region is formed from a semiconductor having a bandgap energy. The semiconductor can be doped or undoped. The induced absorption region is configured to increase a density of free carriers in the semiconductor upon receiving the pulse of light with the first power. In the embodiment shown, the optical waveguide core includes the induced absorption region, but in other embodiments the cladding can include the induced absorption region. In the embodiment shown, the cross-section of the waveguide core in the pulse clipper is constant, and the width of an optical mode 115 of the waveguide 111 is constant.

The waveguide core 120, or more specifically the induced absorption region, is configured, for example by providing a suitable semiconductor such that an additional density of free carriers is created by absorption of light by the instantaneous density of free carriers. This produces a shuttering effect which substantially blocks transmission of the pulse through the optical waveguide after the second duration.

Figure 3:
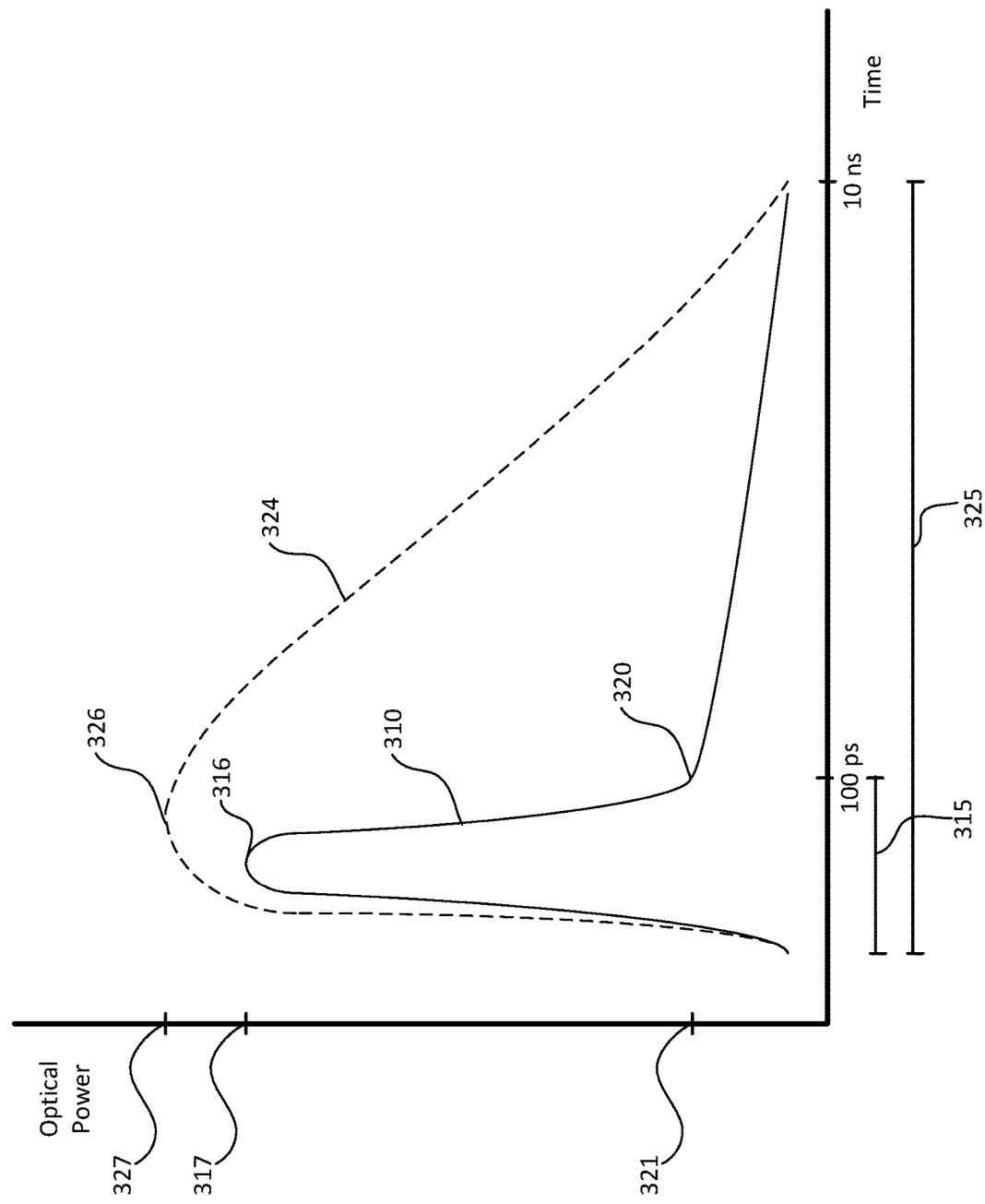
FIG. 3 schematically illustrates a time trace of the instantaneous optical power output from the laser and the pulse clipper of FIG. 2.

FIG. 3 schematically illustrates the instantaneous laser power and optical power output from the pulse clipper of FIG. 2 vs. time. In this example, the laser produces a laser pulse shown in dashed line 324 having a first duration 325. In this example the first duration 325 is shown to be 10 ns and the laser pulse has peak power level 327 at point 326. In one example this peak power level can be 10 Watts. A clipped pulse 310 has a peak power 316 and a second duration 315, which in this example is 100 ps. As stated above, the pulse clipper 110 produces the clipped pulse 310 which has a second peak power level 317 at point 316 close to the first peak power 327 during the second duration 315 and has a significant drop in instantaneous power from the second peak power 317 after the second duration 315. The waveguide core quickly builds up an additional density of free carriers which substantially blocks (clips) the pulse, such that the majority of the clipped pulse after the initial 100 ps, as illustrated at 320, has a significant drop in instantaneous power from the second peak power 317 to a shuttered power level 321. The instantaneous power level can gradually decrease further, as shown, such that an instantaneous power of the clipped pulse 310 at a moment of time after the second duration 315 divided by the second peak power 317 is smaller than an instantaneous power of the laser pulse 324 at the moment of time after the second duration 315 divided by the first peak power 327. In this example the second peak power level 317 close to the first power 327 implies a drop in instantaneous power of only approximately 10% to 50%. Further, as illustrated at 320 the instantaneous power remaining after the significant drop in power is approximately only 2% to 10% of the instantaneous output power from the laser at that moment in time. In some embodiments there may be static losses associated with the pulse clipper, such as optical coupling losses, that cause both 316 and 320 to be reduced by a same additional fraction, wherein such static losses are independent of time and independent of power.

Figure 4:
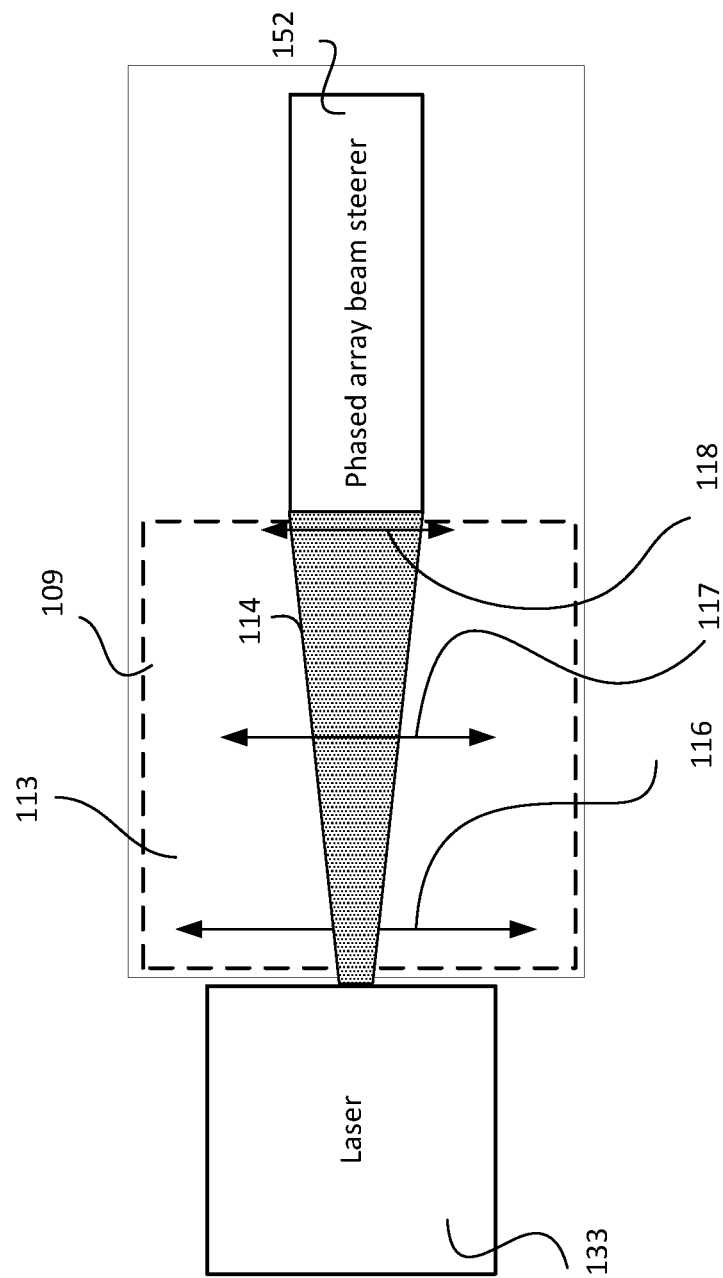
FIG. 4 is a top view of another transmitter including a waveguide core in the shape of an inverse taper, according to an embodiment.

FIG. 4 is a top view of another transmitter including a waveguide core in the shape of an inverse taper, according to an embodiment. FIG. 4 also illustrates that the beam steerer can be a phased array beam steerer 152. It should be pointed out that a phased array beam steerer is not limited to the embodiment of FIG. 4, and can be used with the other embodiments discussed herein, and variations thereof. In this example, the pulse clipper 109 can be an optical waveguide with a cladding 113 and a core 114 in the form of an inverse taper. In an embodiment, the start of the waveguide includes a narrow region of semiconductor surrounded by a dielectric, with the semiconductor region increasing (tapering up) in size. For example, the optical waveguide core 114 includes the induced absorption region configured as an inverse taper having a narrow end proximate to the laser 133. The narrow end of the optical waveguide core 114 receives the pulse of light from the laser 133. In this embodiment, the width of the optical mode decreases as width of the inverse taper increases, schematically illustrated by 116, 117 and 118.

An advantage of the inverse taper example illustrated in FIG. 4 is it can allow for a more powerful laser than the structure illustrated in FIG. 2, with a wider output beam (i.e., the width of the optical mode is wider) than that of FIG. 2. In the embodiment of FIG. 2, depending on such factors as the output power and width of beam generated by the laser, and the material from which the waveguide is formed, there is a risk of damage to the laser or waveguide caused by heat absorbed by the front of the waveguide. In effect the pulse clipper, in clipping the pulse of light, can generate a large amount of heat per unit volume as the power is absorbed by the induced free carriers. By utilizing the inverse taper 114 of FIG. 4, the width 116 of the optical mode is wider at the start of the induced absorption region. Accordingly the optical intensity is lower and the power absorbed per unit volume is proportionately reduced compared to an embodiment without such an inverse taper. As the light moves along the inverse taper, the optical mode reduces in width 117, 118, such that the optical power becomes more concentrated. However, the optical power is also attenuated as the light moves along the inverse taper, and thus the intensity is not excessive and the power absorbed per unit volume remains insufficient to cause damage.

Figure 5:
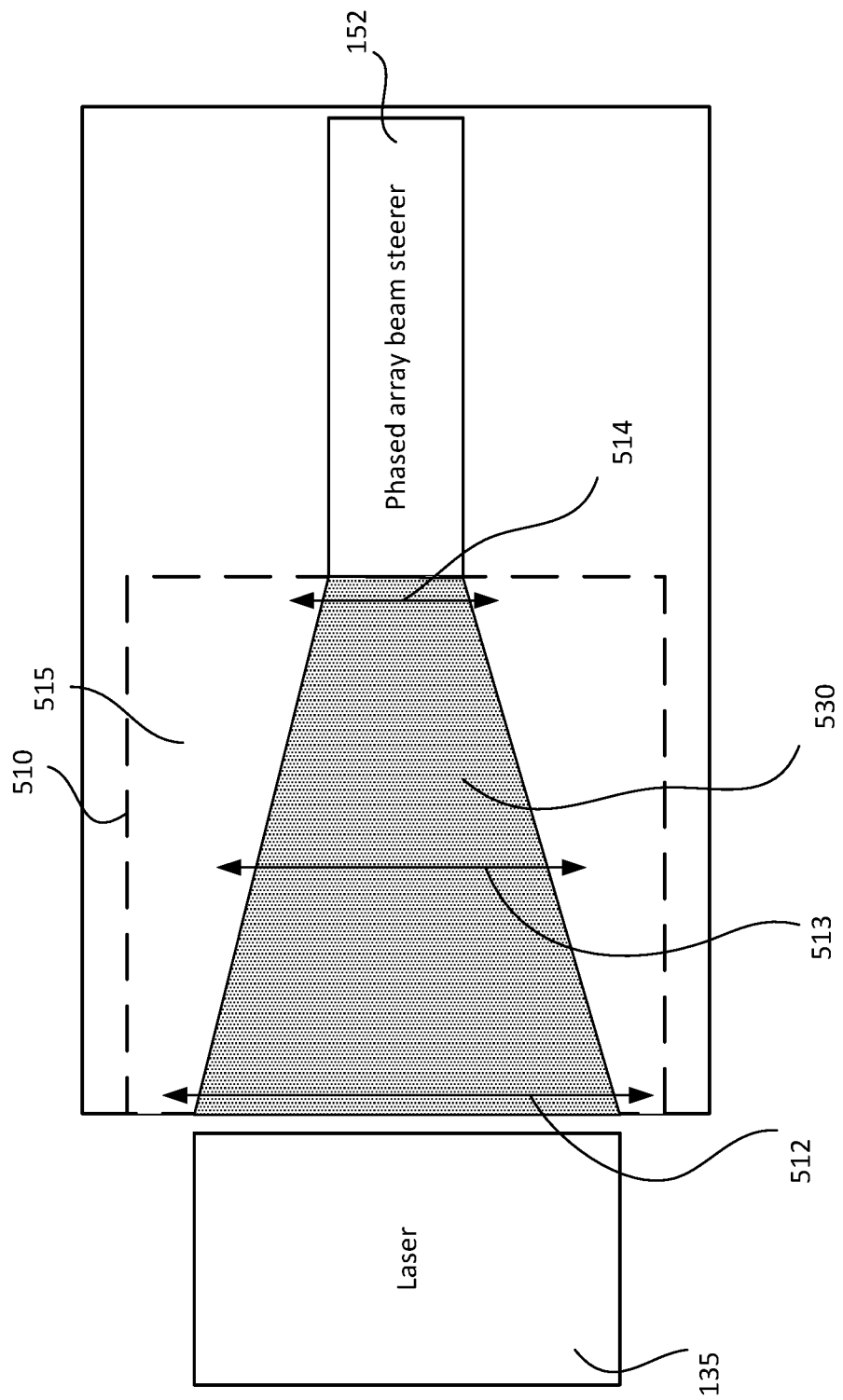
FIG. 5 is a top view of another transmitter including a waveguide core having a wide taper, according to an embodiment.

FIG. 5 is a top view of another transmitter including a waveguide core having a wide taper, according to an embodiment. FIG. 5 also illustrates that the beam steerer can be a phased array beam steerer 152. In this example, the pulse clipper 510 can be an optical waveguide with a cladding 515 and a core 530 in the form of wide taper. In an embodiment, the start of the waveguide includes a wide region of semiconductor surrounded by a dielectric, with the semiconductor region decreasing (tapers down) in size. For example, the optical waveguide core 530 includes the induced absorption region configured as a wide taper having a wide end proximate to the laser 135. The wide end of the optical waveguide core 530 receives the pulse of light from the laser 135. In this embodiment, the width of the optical mode decreases as width of the wide taper decreases, schematically illustrated by 512, 513 and 514. As the width of the optical mode decreases there is a reduced likelihood of sufficient heat per unit volume being generated proximate to the laser 135 to damage the components.

It is pointed out that laser 135 of FIG. 5 feeding the wide taper can have a broad output beam such as a width of 20 µm to 50 µm, laser 131 feeding the pulse clipper 110 of FIG. 2 can have a narrow output beam such as a width of 2 µm, and the laser 133 feeding the inverse taper pulse clipper 109 of FIG. 4 can have a medium output beam such as a width of 4 µm.

Figure 6:
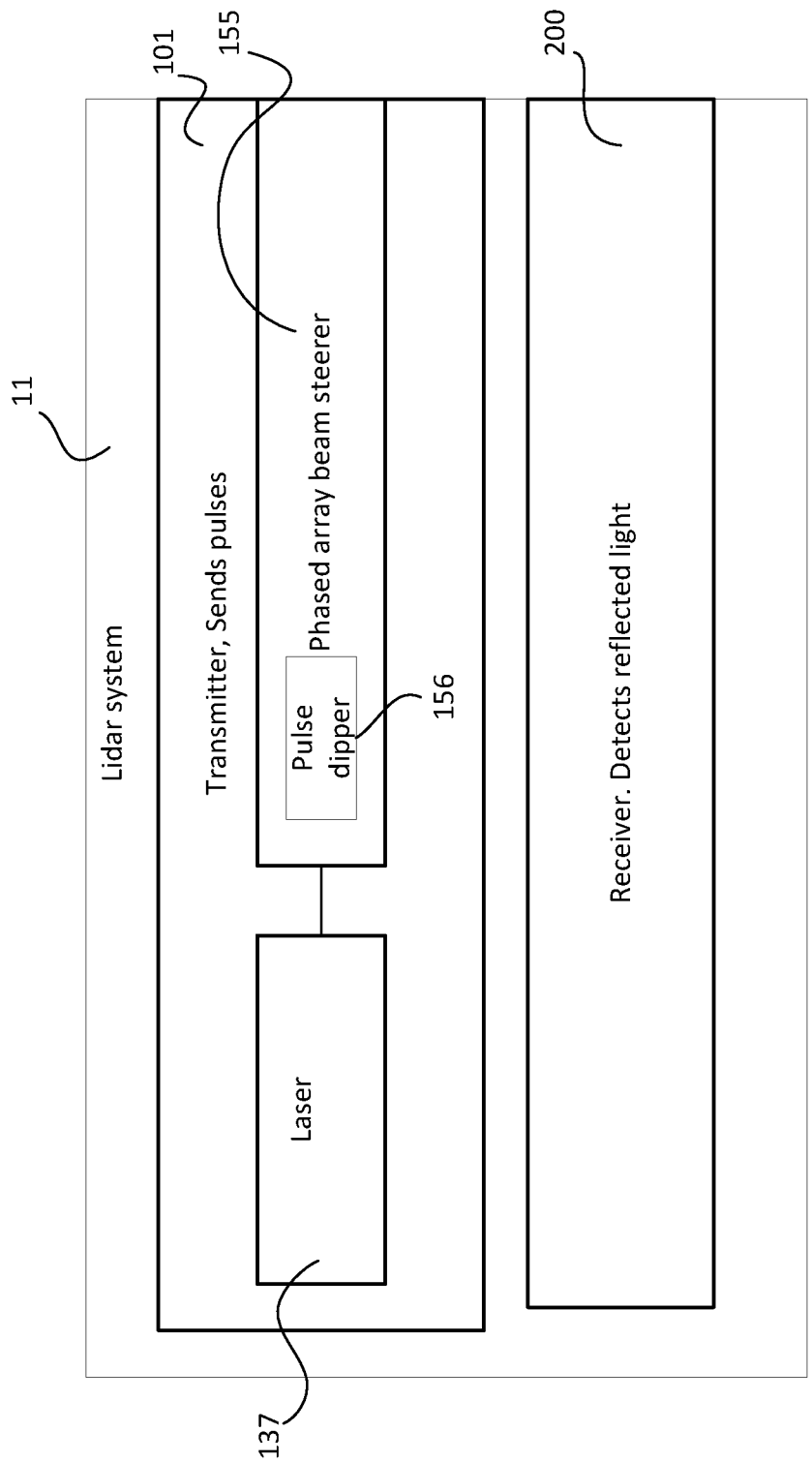
FIG. 6 is a block diagram of another lidar system according to another embodiment.

FIG. 6 is a block diagram of a lidar system 11 according to another embodiment. In this embodiment, the transmitter 101 includes beam steerer (which can be a phased array beam steerer 155) and the pulse clipper 156 which are implemented in a photonic integrated circuit. In other words, beam steerer 155 and pulse clipper 156 can be fabricated on a common substrate of a photonic integrated circuit. In some embodiments, laser 137 can also be included in the same photonic integrated circuit.

In some embodiments the laser produces pulse length between 2 ns and 20 ns, and the pulse clipper is configured to clip the pulse after approximate 100 ps. In some embodiments the laser produces a first power between 5 and 100 watts. In other embodiments, the laser produces a first power between 10 and 30 watts. In some embodiments the waveguide cross-section can be in the order of 0.2 µm$^2$ and of 500 µm long. In some embodiments the peak induced free carrier density is $10^{20}/cm^3$.

Figure 7:
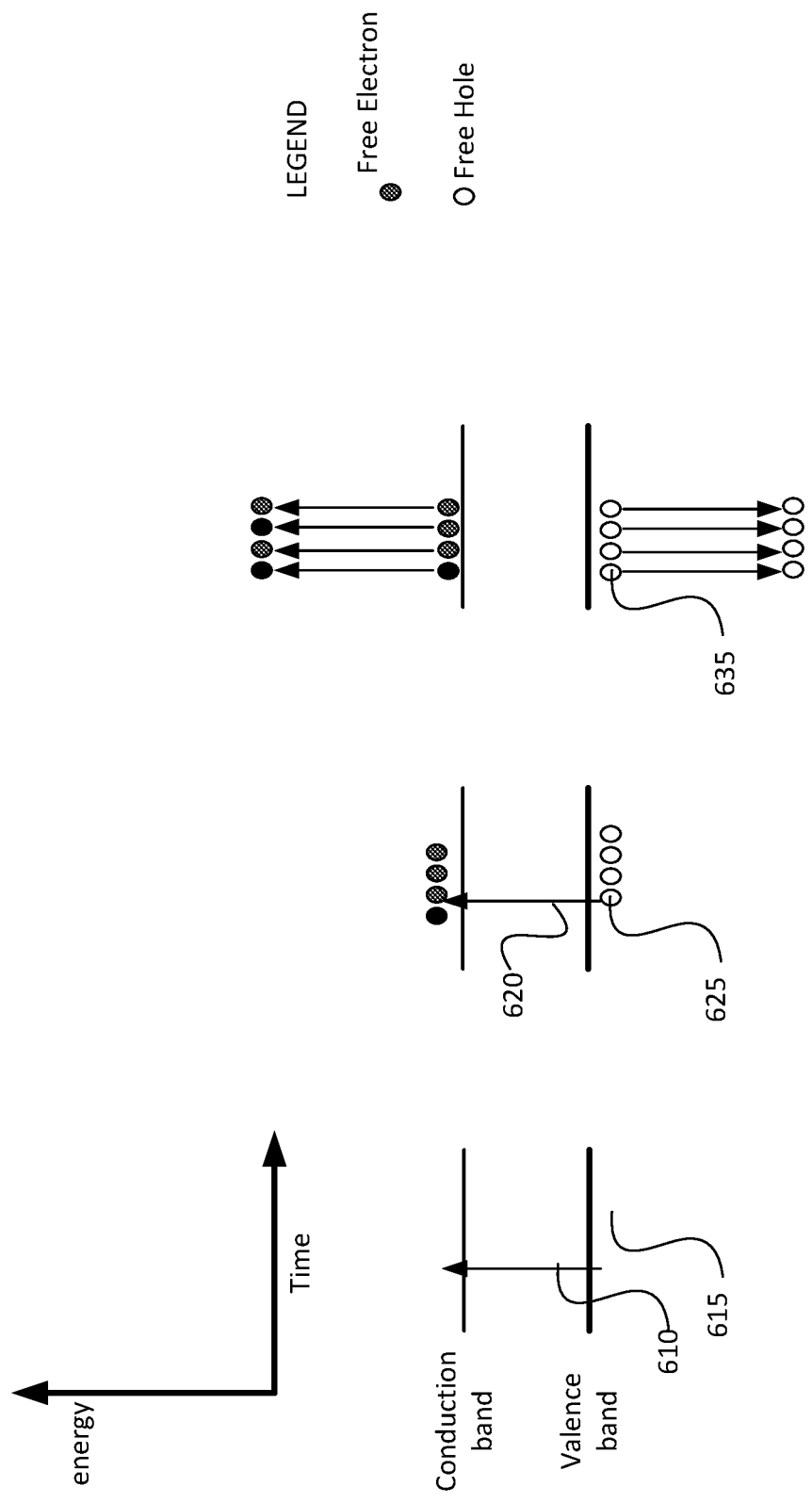
FIG. 7 is an energy band diagram schematically illustrating laser photon energy above the bandgap energy of the waveguide using single photon absorption.

In some embodiments the laser produces a pulse having photon energy greater than the bandgap energy. In such embodiments the shuttering effect is triggered by single photon absorption which increases the density of free carriers. FIG. 7 is an energy band diagram schematically illustrating laser photon energy above the bandgap energy of the induced absorption region using single photon absorption. In other words, FIG. 7 illustrates laser photon energy for a laser pulse with photon energy above the bandgap energy of the pulse clipper. FIG. 7 illustrates a valence band and conduction band at three successive times as the laser pulse propagates through the pulse clipper. At the start of the pulse, as illustrated at 615, the initial density of the free carriers is very low. Inter-band absorption of one photon is illustrated by single arrow 610 as an electron moves from the valence band to the conduction band by single-photon absorption. At the second time, illustrated at 625, the density of free carriers increases. Again Inter-band absorption of one photon is illustrated by single arrow 620. At the third time, illustrated at 635, induced absorption by the free carriers becomes strong. At 635, intra-band absorption of one photon creates more carriers. It should be appreciated that the induced absorption may be due to free electrons, free holes, or, as illustrated, both. It should be appreciated that two-photon absorption may be present, but is not dominant at photon energy above the bandgap energy. As time progresses while the pulse is propagating through the pulse clipper, the number of electrons participating in the process increases. This makes the waveguide increasingly opaque, thus producing the shuttering effect described above. This process occurs dynamically over the second duration, e.g, the 100 ps duration 315 of FIG. 3. By the end of the second duration, the pulse 310 is clipped as the waveguide opaqueness blocks much of the energy from propagating after the point 320 of FIG. 3.

Figure 8:
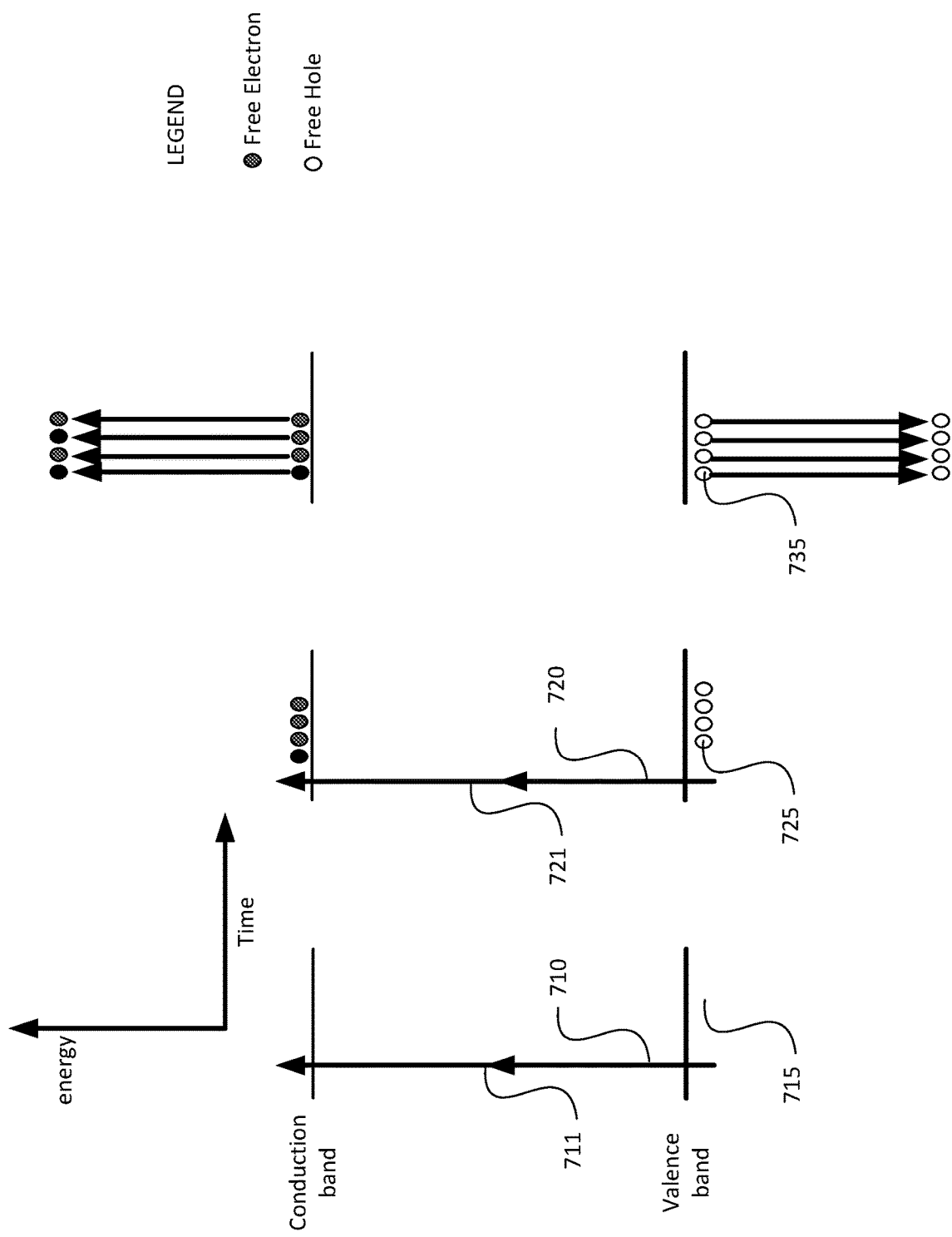
FIG. 8 is an energy band diagram schematically illustrating laser photon energy between half the bandgap energy and the bandgap energy of the waveguide using two-photon absorption.

In some embodiments the laser produces a pulse having a photon energy between half the bandgap energy and the bandgap energy. In such embodiments the shuttering effect is triggered by two-photon absorption which increases the density of free carriers. FIG. 8 is an energy band diagram schematically illustrating laser photon energy between half the bandgap energy and the bandgap energy of the waveguide using two-photon absorption. In other words, FIG. 8 illustrates laser photon energy for a laser pulse with photon energy between half the bandgap energy and the bandgap energy. FIG. 8 illustrates a valence band and conduction band at three successive times as the laser pulse propagates through the pulse clipper. At the start of the pulse, as illustrated at 715, the initial density of the free carriers is very low. Inter-band absorption of two photons is illustrated by concatenated arrows 710 and 711 as an electron moves from the valence band to the conduction band by two-photon absorption. At the second time, illustrated at 725, the density of free carriers increases. Again Inter-band absorption of two photons is illustrated by concatenated arrows 720 and 721 as an electron moves from the valence band to the conduction band by two-photon absorption. At the third time, illustrated at 735, induced absorption by the free carriers becomes strong. At 735, intra-band absorption of two photons creates more carriers. It should be appreciated that the induced absorption may be due to free electrons, free holes, or, as illustrated, both. It should be appreciated that single photon absorption may be present, but is not dominant for a laser pulse with photon energy between half the bandgap energy and the bandgap energy. As time progresses while the pulse is propagating through the pulse clipper, the number of electrons participating in the process increases. This makes the waveguide increasingly opaque, thus producing the shuttering effect described above. This process occurs dynamically over the second duration, e.g. the 100 ps duration 315 of FIG. 3. By the end of the second duration, the pulse 310 is clipped as the waveguide opaqueness blocks much of the energy from propagating after the point 320 of FIG. 3.

Figure 9A:
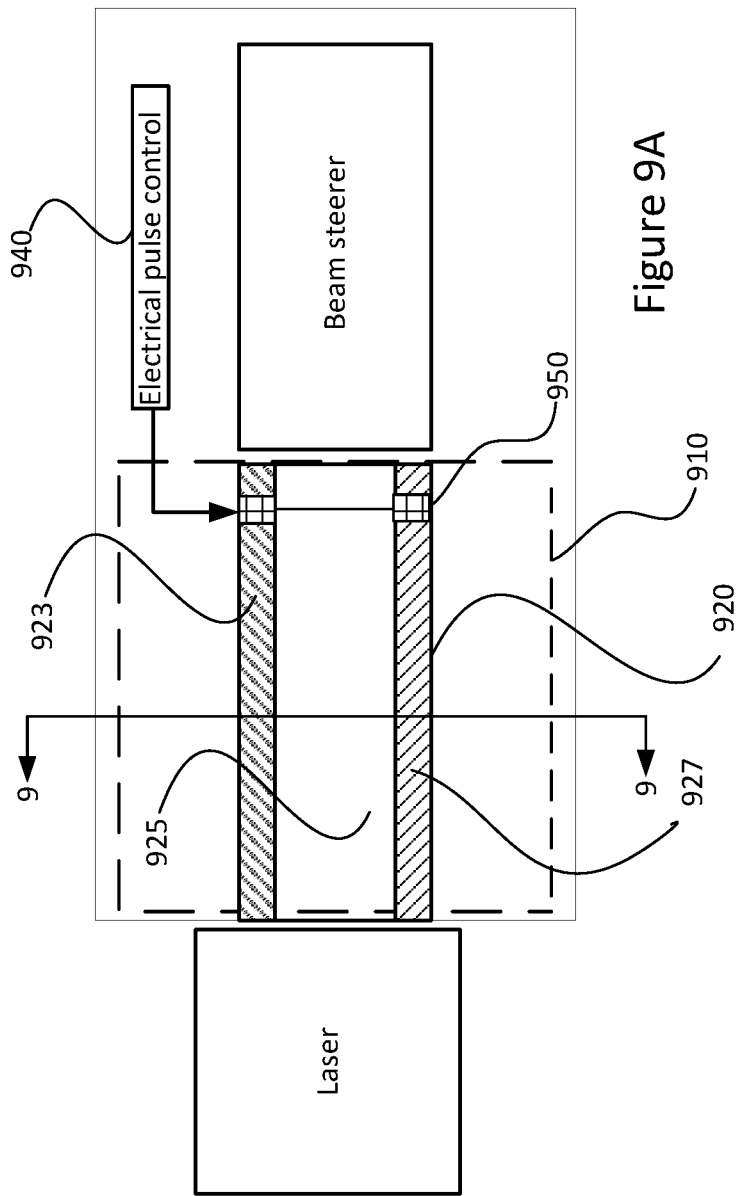
FIG. 9A is a block diagram illustrating an embodiment including a semiconductor junction.
Figure 9B:
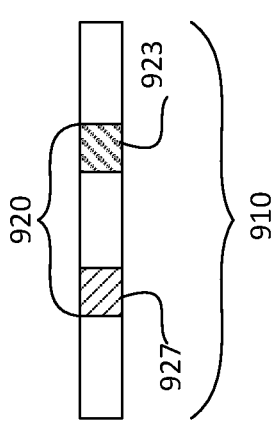
FIG. 9B is a cross-section through line 9-9 of FIG. 9A.

Referring to FIG. 9A an embodiment of a time-of-flight apparatus includes pulse clipper 910 having a semiconductor 920 forming an induced absorption region. The semiconductor 920 can include a P-I-N junction having p-doped 923 and n-doped 927 regions and an intrinsic region 925. FIG. 9B illustrates the P-I-N junction in cross-section. As should be appreciated the intrinsic region 925 can be omitted to form a P-N junction. As should be appreciated, the junction can be disposed laterally as illustrated, or vertically. The semiconductor junction can function to sweep the free carriers out of the induced absorption region. As illustrated, the apparatus can include a pair of electrodes 950 for applying an electric field across the junction to facilitate the sweep out effect. The apparatus can further include an electric pulse control 940 for applying the electric field between laser pulses to reduce the density of free carriers prior to a next laser pulse.

Figure 10:
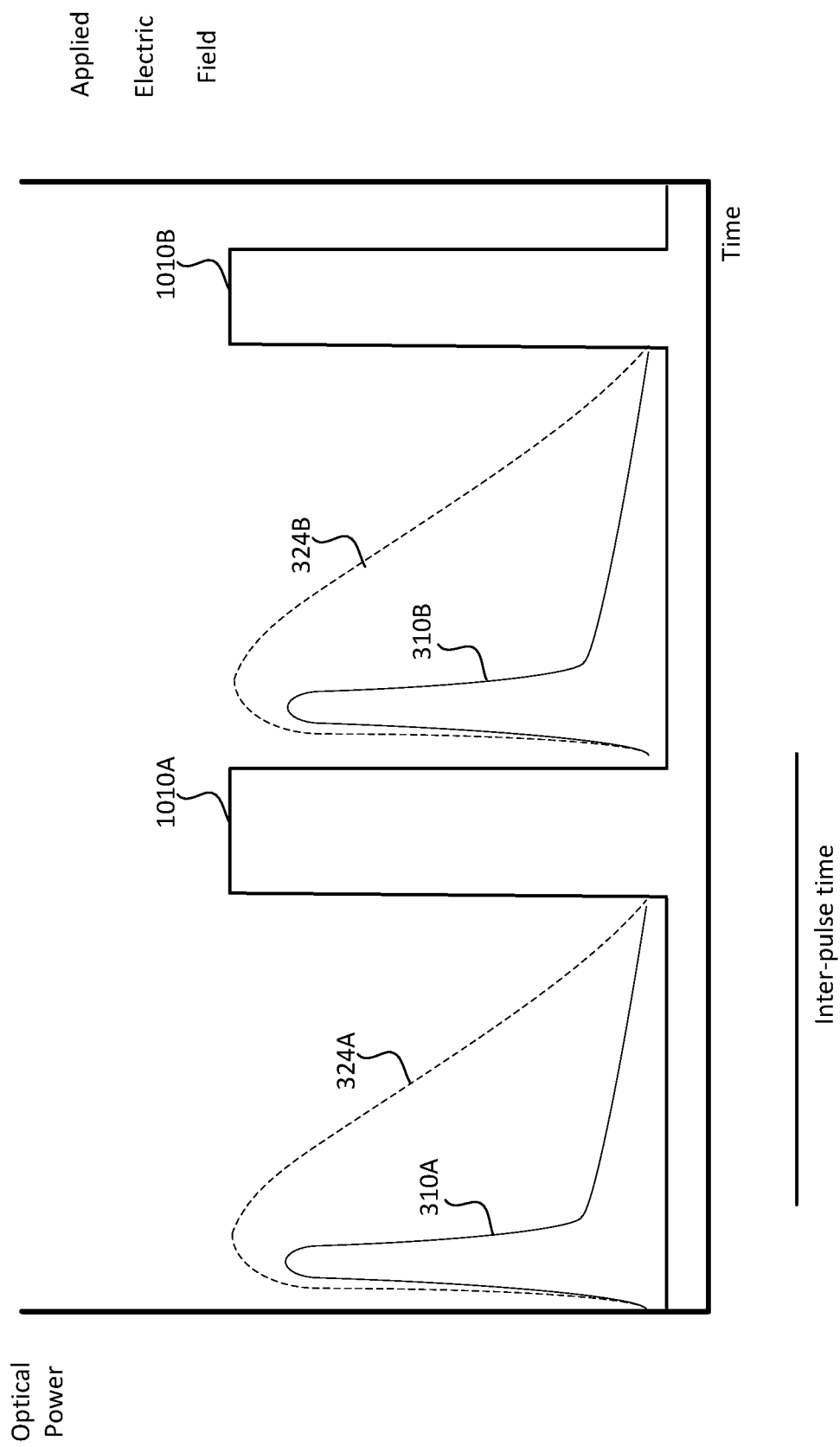
FIG. 10 schematically illustrates a time trace of the instantaneous laser power and optical power output from the apparatus of FIG. 9A, superimposed with a time trace of an electrical field across the semiconductor junction of FIG. 9A, according to an embodiment.

FIG. 10 schematically illustrates a time trace of the instantaneous optical power output from the apparatus of FIG. 9A. An electrical field trace across the semiconductor junction is superimposed. Accordingly the left axis shows instantaneous optical power and the right axis shows electric field magnitude. Electric field pulse 1010A is applied after laser pulse 324A (which produces the clipped pulse 310A). Similarly electric field pulse 1010B is applied after laser pulse 324B (which produces the clipped pulse 310B. The electric field pulses are applied between laser pulses to reduce the density of free carriers prior to each successive laser pulse.

Although the present disclosure has been described with reference to specific features and embodiments thereof, it is evident that various modifications and combinations can be made thereto without departing from the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

The invention claimed is:

1. A time-of-flight apparatus comprising:
a laser configured to produce a laser pulse having a first peak power and first duration; and
a pulse clipper for receiving the laser pulse from the laser, wherein the pulse clipper is configured to produce a clipped pulse from the laser pulse, wherein the clipped pulse has a second duration less than the first duration; wherein the clipped pulse has a second peak power during the second duration and wherein an instantaneous power of the clipped pulse at a moment of time after the second duration divided by the second peak power is smaller than an instantaneous power of the laser pulse at the moment of time after the second duration divided by the first peak power; and wherein the pulse clipper comprises an optical waveguide having an induced absorption region, the induced absorption region comprising a semiconductor having a bandgap energy.

2. The time-of-flight apparatus of claim 1 further comprising a targeting device for directing the clipped pulse towards an external object.

3. The time-of-flight apparatus of claim 2 wherein the targeting device comprises a beam steerer to steer the clipped pulse towards the external object.

4. The time-of-flight apparatus of claim 3 wherein the beam steerer is a phased array beam steerer.

5. The time-of-flight apparatus of claim 3 wherein the beam steerer and the pulse clipper are implemented in a photonic integrated circuit.

6. The time-of-flight apparatus of claim 1 further comprising a receiver configured to receive a portion of the clipped pulse reflected from the external object.

7. The time-of-flight apparatus of claim 1 wherein the semiconductor comprises a junction having p-doped and n-doped regions.

8. The time-of-flight apparatus of claim 7 further comprising a pair of electrodes for applying an electric field across the junction.

9. The time-of-flight apparatus of claim 8 wherein the induced absorption region is configured to increase a density of free carriers in the semiconductor upon receiving the laser pulse and the apparatus further comprising an electric pulse control for applying the electric field between laser pulses to reduce the density of free carriers prior to a next laser pulse.

10. The time-of-flight apparatus of claim 1 wherein the induced absorption region is configured to increase a density of free carriers in the semiconductor upon receiving the laser pulse.

11. The time-of-flight apparatus of claim 10 wherein an additional density of free carriers is created by absorption of light by free carriers.

12. The time-of-flight apparatus of claim 10 wherein the laser and the pulse clipper are configured such that the free carriers induced in the semiconductor produce a shuttering effect which substantially blocks transmission of the pulse through the optical waveguide after the second duration.

13. The time-of-flight apparatus of claim 12 wherein the laser produces a pulse having photon energy between half the bandgap energy and the bandgap energy.

14. The time-of-flight apparatus of claim 13 wherein the shuttering effect is triggered by two-photon absorption which increases the density of free carriers.

15. The time-of-flight apparatus of claim 12 wherein the laser produces a pulse having photon energy above the bandgap energy.

16. The time-of-flight apparatus of claim 15 wherein the shuttering effect is triggered by single photon absorption which increases the density of free carriers.

17. The time-of-flight apparatus of claim 1 wherein the optical waveguide includes a waveguide core comprising the induced absorption region configured as an inverse taper having a narrow end proximate to the laser.

18. The time-of-flight apparatus of claim 17 wherein the laser has an optical mode output width of a few micrometers and the pulse clipper is configured such that the width of the optical mode is wider at the narrow end than at a wider end of the inverse taper.

19. The time-of-flight apparatus of claim 17 wherein the first peak power is between 5 Watts and 100 Watts.

20. The time-of-flight apparatus of claim 17 wherein the first peak power is between 10 Watts and 30 Watts.

21. The time-of-flight apparatus claim 1 wherein the optical waveguide includes a waveguide core comprising the induced absorption region configured as a wide waveguide taper having a wide end receiving the pulse from the laser and a narrow end coupled to the beam steerer.

22. The time-of-flight apparatus of claim 1 wherein the first duration is between 2 ns and 20 ns, and the second duration is approximately 100 ps.

23. A lidar system comprising:
a transmitter; and
a receiver;
wherein
the transmitter comprises:
   a laser configured to produce a laser pulse having a first peak power and a first duration;
   a pulse clipper for receiving the laser pulse from the laser, wherein the pulse clipper is configured to produce a clipped pulse from the laser pulse, wherein the clipped pulse has a second peak power during a second duration and wherein an instantaneous power of the clipped pulse at a moment of time after the second duration divided by the second peak power is smaller than an instantaneous power of the laser pulse at the moment of time after the second duration divided by the first peak power; and
   a beam steerer for steering the clipped pulse towards an external object;
wherein the receiver is configured to receive a portion of the clipped pulse reflected from the external object;
wherein the pulse clipper comprises an optical waveguide having an active region, the active region comprising a semiconductor having a bandgap energy.

24. The lidar system of claim 23 wherein the laser and pulse clipper are configured such that free carriers induced in the semiconductor produce a shuttering effect which substantially blocks transmission of the pulse through the optical waveguide after the second duration.

25. The lidar system of claim 23 wherein the beam steerer is a phased array beam steerer.

26. The lidar system of claim 25 wherein the beam steerer and pulse clipper are fabricated on a common substrate of a photonic integrated circuit.

* * * * *